United States Patent
Lindberg et al.

(10) Patent No.: US 12,449,633 B2
(45) Date of Patent: Oct. 21, 2025

(54) ADJUSTING INTERPUPILLARY DISTANCE AND EYE RELIEF DISTANCE OF A HEADSET

(71) Applicant: Meta Platforms Technologies, LLC, Menlo Park, CA (US)

(72) Inventors: David Christopher Lindberg, Portland, OR (US); Ryan Michael Ebert, Issaquah, WA (US); Nathaniel David Ginzton, Boise, ID (US); Seth Moczydlowski, Austin, TX (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 674 days.

(21) Appl. No.: 17/848,336

(22) Filed: Jun. 23, 2022

(65) Prior Publication Data

US 2023/0418022 A1    Dec. 28, 2023

(51) Int. Cl.
*G02B 7/12* (2021.01)
*G01B 7/14* (2006.01)
*G06F 1/16* (2006.01)

(52) U.S. Cl.
CPC ............. *G02B 7/12* (2013.01); *G01B 7/14* (2013.01); *G06F 1/163* (2013.01)

(58) Field of Classification Search
None
See application file for complete search history.

(56) References Cited

U.S. PATENT DOCUMENTS

| | | |
|---|---|---|
| 1,206,134 A | 11/1916 | Otte |
| 2,935,910 A | 5/1960 | Schmidt |
| 10,401,625 B2 | 9/2019 | Petrov |
| 11,347,307 B1 | 5/2022 | Knoppert et al. |
| 2006/0072206 A1 | 4/2006 | Tsuyuki et al. |
| 2012/0147316 A1 | 6/2012 | Loeb, Jr. et al. |
| 2017/0184847 A1 | 6/2017 | Petrov |
| 2019/0041643 A1* | 2/2019 | Chang ............... H04N 13/398 |
| 2019/0258065 A1 | 8/2019 | Yun et al. |
| 2019/0391385 A1 | 12/2019 | Mashimo |
| 2020/0093361 A1 | 3/2020 | Jackson et al. |

(Continued)

OTHER PUBLICATIONS

Office Action for U.S. Appl. No. 17/848,343, mailed on Jun. 28, 2023, David Christopher Lindberg, "Adjusting Interpupillary Distance and Eye Relief Distance of a Headset", 11 pages.

(Continued)

*Primary Examiner* — Robert E. Tallman
(74) *Attorney, Agent, or Firm* — Greenberg Traurig, LLP

(57) ABSTRACT

A headset includes an optical assembly, an adjustment assembly, and a measurement component. The measurement component is configured to measure an interpupillary distance provided by an adjustment assembly in a first direction and an eye relief distance provided by the adjustment assembly in a second direction, where the first direction is orthogonal to the second direction. The measurement component includes a first rheostat configured to measure the interpupillary distance and a second rheostat configured to measure the eye relief distance, wherein the second rheostat is placed parallel to the first rheostat. The measurement component further includes a linkage configured to translate a motion of the adjustment assembly in the second direction to the first direction.

20 Claims, 8 Drawing Sheets

(56) References Cited

U.S. PATENT DOCUMENTS

2020/0310137 A1\* 10/2020 Lan .................. F16M 11/043
2021/0080746 A1 3/2021 Mirabella et al.

OTHER PUBLICATIONS

Non-Final Office Action mailed Nov. 15, 2023 for U.S. Appl. No. 17/848,343, filed Jun. 23, 2022, 12 pages.
Office Action for U.S. Appl. No. 17/848,327, mailed on Dec. 8, 2022, Ebert, "Adjusting Interpupillary Distance and Eye Relief Distance of a Headset", 14 pages.
Office Action for U.S. Appl. No. 17/848,343, mailed on Feb. 14, 2023, David Christopher Lindberg, "Adjusting Interpupillary Distance and Eye Relief Distance of a Headset", 10 pages.
Lang, "HTC Vive Setup Guide Reveals IPD, Eye-relief Adjustments, and More," Road to VR, retrived from <<https://www.roadtovr.com/htc-vive-setup-guide-reveals-ipd-and-eye-relief-adjustments-steamvr/>> on Mar. 23, 2022, published Jun. 9, 2015, 11 pages.
Moscatello, "What are "eye relief" and "IPD" and why are they important?," Feather Edge Optics, retrieved from <<https://featheredgeoptics.org/blog/what-are-eye-relief-and-ipd-and-why-are-they-important/>> on Mar. 23, 2022, published Aug. 9, 2020, 3 pages.

\* cited by examiner

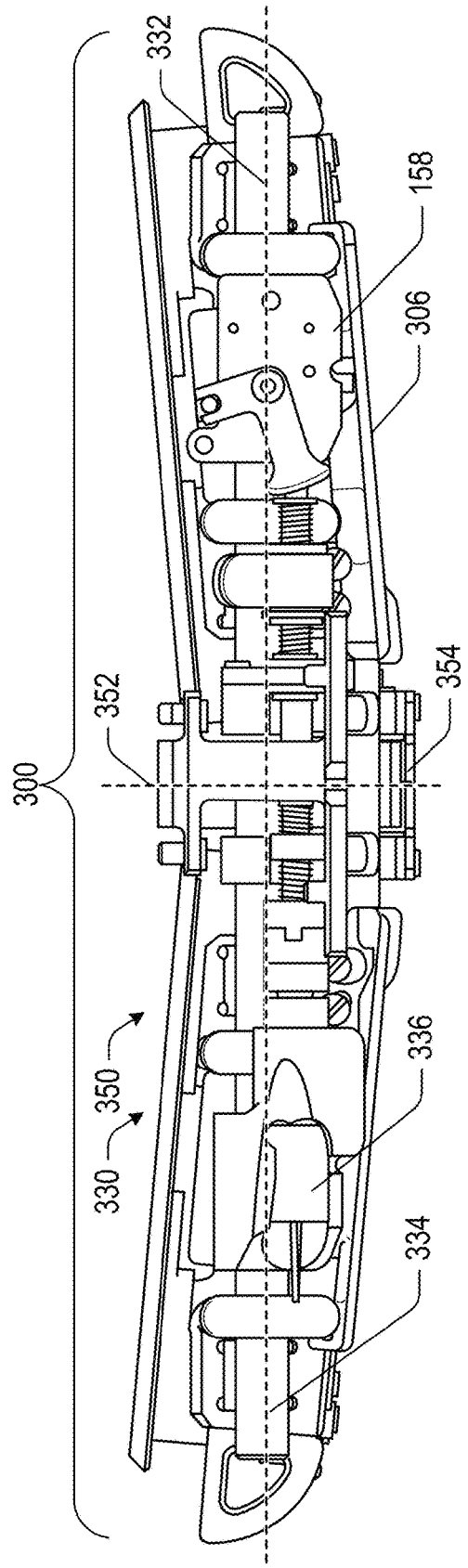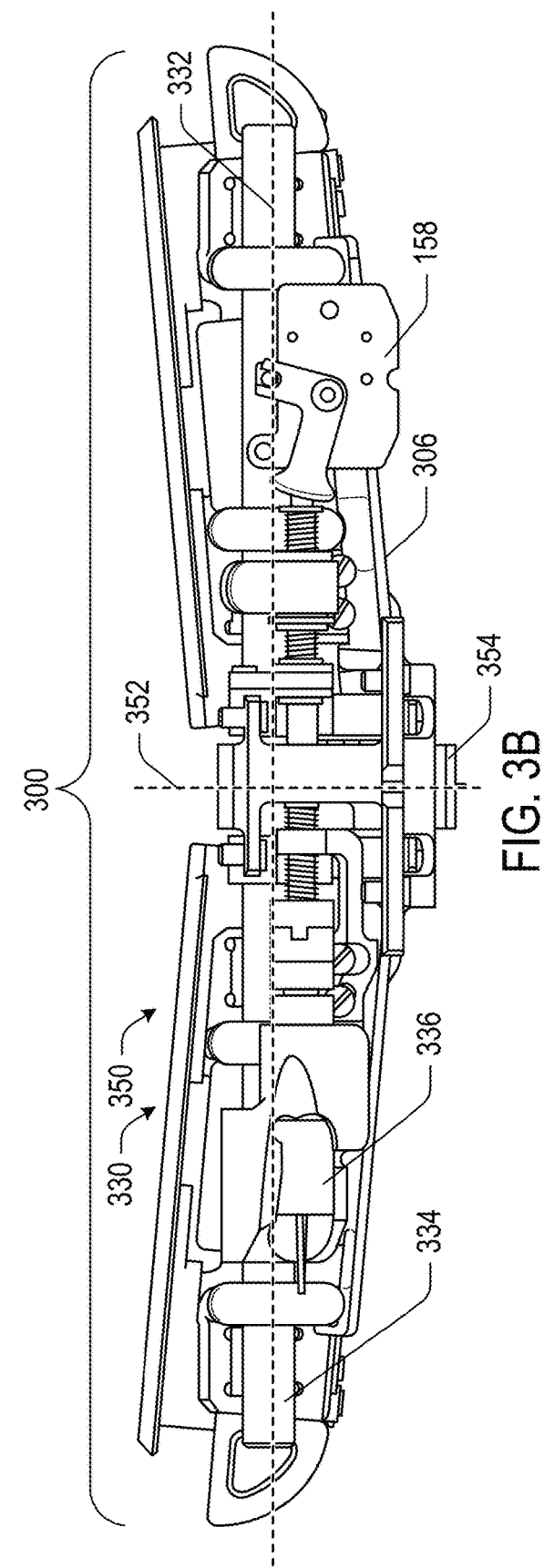

ADJUSTING INTERPUPILLARY DISTANCE AND EYE RELIEF DISTANCE OF A HEADSET

FIELD OF THE INVENTION

The present disclosure generally relates to head-mounted displays (HMDs), and specifically relates to an adjustment assembly for adjusting interpupillary distance and/or eye relief distance in HMD.

BACKGROUND

Recent years have seen significant advancements in hardware and software platforms for generating and providing extended reality experiences. Indeed, HMDs for providing extended reality (e.g., virtual reality, augmented reality, mixed reality, etc.) have grown in popularity, and technological advancements have facilitated its use in a variety of applications, such as gaming, online shopping, military training, and tourism. People wearing these HMDs may have different interpupillary distances and/or desired eye relief distances. In some instances, conventional HMDs enable users to manually adjust the interpupillary distance and the eye relief distance via separate mechanisms. However, such an approach can result in the HMD being heavy and bulky and may cause difficulties in the process of adjusting the interpupillary distance and the eye relief distance.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 3A and 3B illustrate perspective top-down views of the example adjustment assembly of FIG. 1, in accordance with one or more examples.

DETAILED DESCRIPTION

Figure 1:
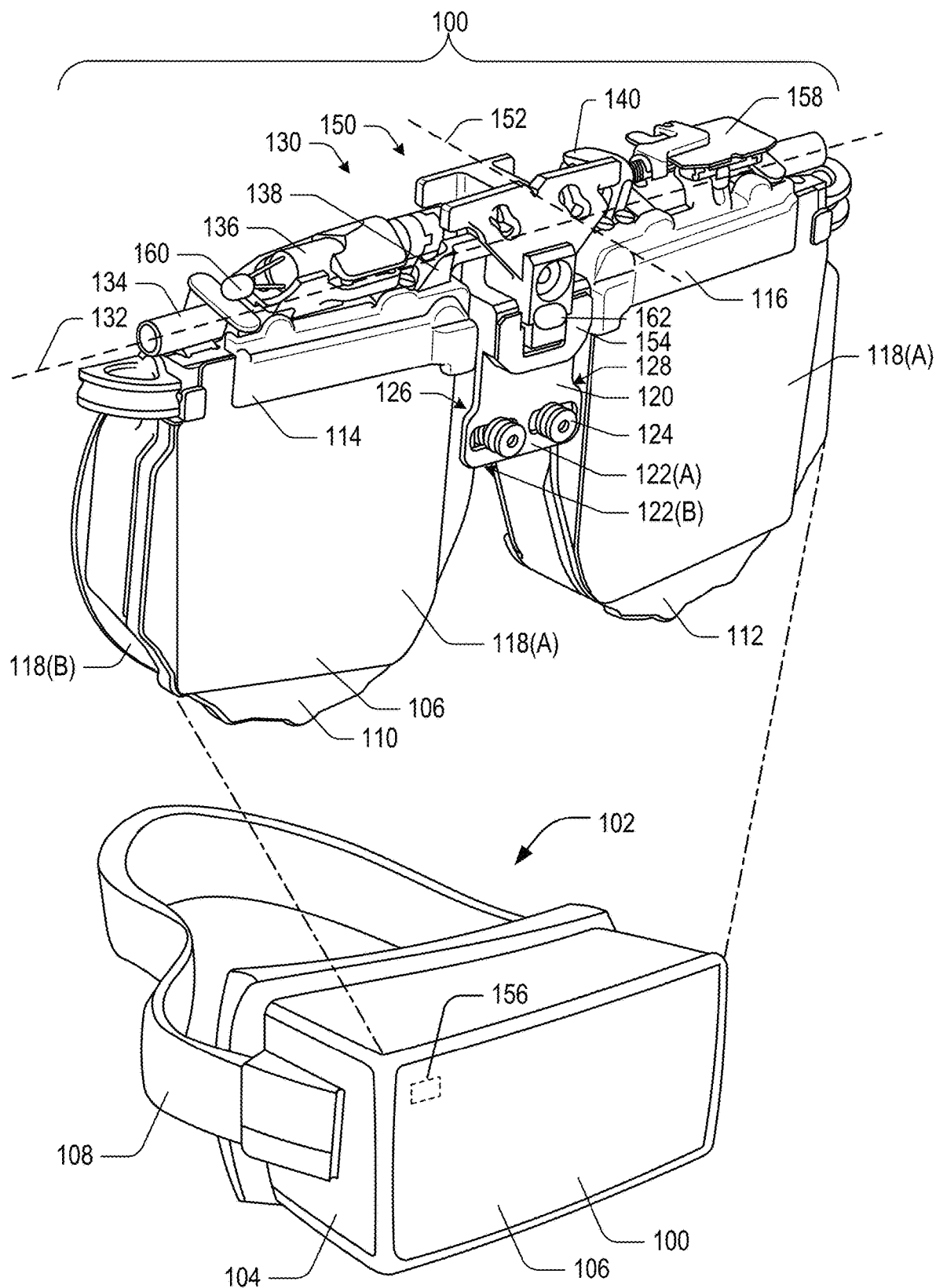
FIG. 1 illustrates a perspective view of an example headset, including an example adjustment assembly, shown in the excerpted view, in accordance with one or more examples of the present disclosure.

Conventional headsets, including extended-reality headsets, may enable users to manually adjust interpupillary distance and/or eye relief distance via separate, manual mechanisms. However, such an approach can result in the HMD being heavy and bulky and may cause difficulties in the process of adjusting the interpupillary distance and the eye relief distance. Thus, the described techniques provide functionality beyond what is provided in conventional electronic devices by providing an adjustment assembly for adjusting interpupillary distance and eye relief distance in the HMD.

As used herein, the term "extended-reality headset" refers to a computing device having extended-reality capabilities and/or features. In particular, an extended-reality headset can refer to a computing device that can present an extended-reality graphical user interface. An extended-reality headset can further display one or more visual elements within the extended-reality graphical user interface and receive user input that targets those visual elements. For example, an extended-reality headset can include, but is not limited to, a virtual reality device, an augmented reality device, or a mixed reality device. In particular, an extended-reality device can include any device capable of presenting a full or partial extended-reality environment. Nonlimiting examples of extended-reality headsets can be found throughout this application.

In some examples, a headset having an adjustment assembly for adjusting interpupillary distance and eye relief distance is described herein. The headset includes a housing, an optical assembly disposed in the housing, and the adjustment assembly coupling the optical assembly to the housing. The optical assembly includes a first lens (e.g., a left lens) and a second lens (e.g., a right lens) spaced from the first lens by a first distance. The adjustment assembly includes an interpupillary distance adjustment mechanism for adjusting the first distance between the first lens and the second lens along a first axis (e.g., in a lateral direction relative to a wearer of the HMD), and an eye relief distance adjustment mechanism for adjusting a second distance of the optical assembly along a second axis orthogonal to the first axis (e.g., in a generally forward gaze direction of the wearer of the HMD). The adjustment assembly is configured to enable independent adjustment of the interpupillary distance and eye relief distance using a single floating adjustment assembly.

In some examples, the optical assembly includes a first lens holder for holding the first lens and a second lens holder for holding the second lens. Each of the first lens holder and the second lens holder may include a cover plate configured to clamp the respective lens. In some examples, the optical assembly further includes a constraint member for passively constraining rotation of the first lens and the second lens while allowing the first lens and the second lens to move relative to one another along the first axis. The constraint member may include a first plate and a second plate coupled with one or more spring-loaded screws. At least a first portion of the first lens and a second portion of the second lens are positioned between and constrained by the first plate and the second plate against rotation. This sort of passive constraint mechanism allows the lens assemblies to slide smoothly along the first axis without binding.

The interpupillary distance adjustment mechanism of the adjustment assembly may enable a user to adjust the first lens and the second lens of the optical assembly closer together or farther apart so that the first distance between the lenses matches the interpupillary distance of the user. The interpupillary distance adjustment mechanism includes a shaft and a turnbuckle coupled with a first connection member and a second connection member. The first connection member is attached to the first lens holder of the optical assembly, and the second connection member is attached to the second lens holder of the optical assembly. The turnbuckle is configured to cause the first connection member and the second connection member to slide away from or closer to each other along the shaft. In some examples, the interpupillary distance adjustment mechanism may include a motor configured to drive the turnbuckle. The motor may be coupled to the turnbuckle by one or more linkages or gear reductions to achieve the desired adjustment speeds. By rotating the turnbuckle in a first direction (e.g., clockwise), the first connection member and the second connection member can be driven to slide away from each other, thereby causing the first lens holder and the second lens holder to move farther apart. By rotating the turnbuckle in a second direction (e.g., counterclockwise), the first connection member and the second connection member can be driven to slide closer to each other, thereby causing the first lens holder and the second lens holder to move closer together. In this example, the first and second lens assemblies are driven in concert by the turnbuckle, such that the first and second lens assemblies are maintained an equal distance from a lateral center of the HMD.

In some examples, the headset may include a sensing component (e.g., a gaze tracking component, an eye-tracking component, a camera, etc.) configured to measure the interpupillary distance of the user and a measurement component configured to measure the first distance between the first lens and the second lens. The adjustment assembly may compare the interpupillary distance with the first distance, and the interpupillary distance adjustment mechanism may adjust the first distance based on the comparison.

The eye relief distance adjustment mechanism of the adjustment assembly may enable a user to adjust the optical assembly closer to or farther from the eyes of the user so that the second distance between the optical assembly to the eyes of the user matches the eye relief distance of the user. The eye relief distance adjustment mechanism includes a slide system configured to move the optical assembly along the second axis that is orthogonal to the first axis to adjust the second distance between the optical assembly to the eyes of the user. In some examples, the eye relief distance adjustment mechanism may include a motor configured to drive the slide system.

In some examples, the headset may receive eye relief distance provided by the user or sensed by the sensing component or another sensing component, and the measurement component may measure the second distance between the optical assembly to the eyes of the user. The adjustment assembly may compare the eye relief distance of the user with the second distance, and the eye relief distance adjustment mechanism may adjust the second distance based on the comparison.

Example Adjustment Assembly

FIG. 1 illustrates a perspective view of an example headset, including an example adjustment assembly, shown in the excerpted view. Although the disclosure provides description of an adjustment assembly 100 as part of a headset 102 (e.g., an extended-reality headset), it is to be understood that the adjustment assembly 100 may be included in any suitable eyepieces, such as glasses, helmets, or other headset devices. As illustrated in FIG. 1, the headset 102 can include a housing 104, an optical assembly 106, the adjustment assembly 100, and a strap 108. The optical assembly 106 can be disposed in a substantially central region of the housing 104. The adjustment assembly 100 can be coupled to the optical assembly 106. The strap 108 can be coupled to the housing 104 and can be adjustable in order to fit the head shape and size of any user and/or to stabilize the headset 102 relative to the head of a user. In this example, the strap 108 is shown as a flexible or resilient strap, in other examples, the strap may comprise a semi-rigid, telescoping strap that retains is shape and position while adjusting in length/circumference to fit the head of the user.

The optical assembly 106 can include a first lens 110 (e.g., a left lens) and a second lens 112 (e.g., a right lens) spaced from the first lens 110 by a first distance. In some examples, the optical assembly 106 can include a first lens holder 114 configured to hold the first lens 110 and a second lens holder 116 configured to hold the second lens 112. In some examples, each of the first lens 110 and the second lens 112 can include a single optical element (e.g., a display). In other examples, each of the first lens 110 and the second lens 112 can include a plurality of optical elements. For example, each of the first lens 110 and the second lens 112 can include one or more optical elements and one or more source elements. The one or more optical elements may include, for example, but not limited to, shaped lenses, holographic lenses, phase lenses, polarizing elements, reflecting elements, etc. The one or more source elements may include, for example, but not limited to, displays, backlight elements, projectors, filters, occlusion elements, etc.

In the particular example shown in FIG. 1, each of the first lens holder 114 and the second lens holder 116 includes two cover plates 118(A) (e.g., a rear cover plate) and 118(B) (e.g., a front cover plate) configured to clamp the first lens 110 or the second lens 112. In some examples, the size and/or shape of the cover plates may vary. The cover plates 118(A) and 118(B) may include any suitable material. In some examples, the cover plates 118(A) and 118(B) may be formed from the same material, such as a transparent material (e.g., plastic, glass, etc.). In some examples, the cover plates 118(A) and 118(B) may be formed from different materials. For example, the cover plate 118(B) (e.g., a front cover plate) may be formed from a transparent material (e.g., plastic, glass, etc.), and the cover plate 118(A) (e.g., a rear cover plate) may be formed from a non-transparent material (e.g., foam coated with enhanced specular reflector film).

In some examples, the optical assembly 106 can further include a constraint member 120 configured to passively constrain rotation of the first lens 110 and the second lens 112 while allowing the first lens 110 and the second lens 112 to move relative to one another along a first axis 132. The constraint member 120 can include a first plate 122(A) and a second plate 122(B) coupled to the first plate 122(A) by one or more spring-loaded screws 124. At least a first portion 126 of the first lens 110 and a second portion 128 of the second lens 112 are positioned between and constrained by the first plate 122(A) and the second plate 122(B) against rotation. In some examples, the one or more spring-loaded screws 124 are further coupled with the cover plates 118(A) and 118(B) of each of the first lens holder 114 and the second lens holder 116. In the particular example shown in FIG. 1, the constraint member 120 includes two spring-loaded screws 124. However, in various examples, a lesser or greater number of spring-loaded screws 124 may be coupled to the first plate 122(A) and the second plate 122(B) to passively constrain rotation of the first lens 110 and the second lens 112 about the first axis 132. The constraint mechanism 120 allows the first lens 110 and the second lens 112 to slide smoothly along the first axis 132 without binding.

The adjustment assembly 100 can be coupled to the optical assembly 106. The adjustment assembly 100 can include an interpupillary distance adjustment mechanism 130 and an eye relief distance adjustment mechanism 150. The interpupillary distance adjustment mechanism 130 of the adjustment assembly 100 is configured to adjust the first distance between the first lens 110 and the second lens 112 along the first axis 132. For example, the interpupillary distance adjustment mechanism 130 of the adjustment assembly 100 may enable a user to adjust the first lens 110 and the second lens 112 of the optical assembly 106 closer together or farther apart so that the first distance between the first lens 110 and the second lens 112 matches interpupillary distance of the user. The eye relief distance adjustment mechanism 150 of adjustment assembly 100 is configured to adjust a second distance of the optical assembly 106 along a second axis 152 that is orthogonal to the first axis 132. For example, the eye relief distance adjustment mechanism 150 of the adjustment assembly 100 may enable the user to adjust the optical assembly 106 closer to or farther from the eyes of the user so that the second distance between the optical assembly 106 to the eyes of the user matches eye relief distance of the user.

In some examples, the interpupillary distance adjustment mechanism 130 of the adjustment assembly 100 can include a shaft 134 and a turnbuckle 136. The turnbuckle 136 can be coupled with a first connection member 138 and a second connection member 140. The first connection member 138 can be attached to the first lens holder 114, and the second connection member 140 can be attached to the second lens holder 116.

The turnbuckle 136 is configured to cause the first connection member 138 and the second connection member 140 to slide away from or closer to each other along the shaft 134. By rotating the turnbuckle 136 in a first direction (e.g., clockwise), the first connection member 138 and the second connection member 140 can be driven to slide away from each other, thereby causing the first lens holder 114 holding the first lens 110 and the second lens holder 116 holding the second lens 112 to move farther apart. By rotating the turnbuckle 136 in a second direction (e.g., counterclockwise), the first connection member 138 and the second connection member 140 can be driven to slide closer to each other, thereby causing the first lens holder 114 holding the first lens 110 and the second lens holder 116 holding the second lens 112 to move closer together. In some examples, the interpupillary distance adjustment mechanism 130 of the adjustment assembly 100 can include a motor 160 configured to drive the turnbuckle 136. In other examples, the interpupillary distance adjustment mechanism can operate or be controlled via an adjusting knob. The adjusting knob may be attached to an approximal end of the turnbuckle 136. The user may manually rotate the adjusting knob in order to cause the turnbuckle 136 to rotate in the first direction or the second direction, thereby adjusting the first distance between the first lens 110 and the second lens 112. In other examples, other types of linkages or gears could be used to move the first lens 110 and the second lens 112 closer to or away from each other, such as one or more screw drives, one more linear gears, one or more rack and pinion gears, etc.

In some examples, the eye relief distance adjustment mechanism 150 of the adjustment assembly 100 can include a slide system 154 configured to move the optical assembly 106 along the second axis 152 that is orthogonal to the first axis 132 to adjust the second distance between the optical assembly 106 to the eyes of the user. For example, the slide system 154 can include gear, a rack coupled to the gear, and an attachment structure attaching to the rack and the optical assembly 106. The gear is configured to cause the rack to move the attachment structure forward or backward, thereby adjusting the second distance between the optical assembly 106 to the eyes of the user.

In some examples, the eye relief distance adjustment mechanism 150 of the adjustment assembly 100 can include a motor 162 configured to drive the gear. By rotating the gear in a first direction (e.g., clockwise), the rack can be driven to move the attachment structure forward, thereby causing the optical assembly 106 to move away from the eyes of the user. By rotating the gear in a second direction (e.g., counterclockwise), the rack can be driven to move the attachment structure backward, thereby causing the optical assembly 106 to move closer to the eyes of the user. In some examples, the eye relief distance adjustment mechanism 150 can operate or be controlled via an adjusting knob. The adjusting knob may be attached to the gear. The user may manually rotate the adjusting knob in order to cause the gear to rotate in the first direction or the second direction, thereby adjusting the second distance between the optical assembly 106 to the eyes of the user. In other examples, other types of linkages or gears could be used to move the first lens 110 and the second lens 112 laterally in or out, such as one or more screw drives, one more linear gears, one or more rack and pinion gears, etc.

In some examples, the headset 102 can cause the adjustment assembly 100 to adjust the first distance between the first lens 110 and the second lens 112 based on interpupillary distance of the user and cause the adjustment assembly 100 to adjust the second distance between the optical assembly 106 to the eyes of the user based on eye relief distance of the user. For example, the headset 102 can receive user input (e.g., voice command(s), gestures, touch inputs, controller inputs, etc.) to adjust the first distance and the second distance to the interpupillary distance and the eye relief distance of the user. Responsive to receiving the user input, one or more processor(s) of the headset 102 can determine the interpupillary distance and the eye relief distance of the user.

In some examples, the interpupillary distance and/or the eye relief distance can be provided by the user, such as via user input (e.g., voice command(s), gestures, touch inputs, controller inputs, etc.).

In some examples, the headset 102 can further include a sensing component 156 configured to measure the interpupillary distance of the user. For example, the sensing component 156 can include one or more camera(s), IR devices, depth camera assemblies, and the like to capture image data associated with the eyes of the user. In some examples, the sensing component 156 may include one or more infrared illuminators that may produce structured light (e.g., dot patter, bars, etc.) in infrared, infrared flash for time-of-flight, and so forth, such that the sensing component 156 may then determine gaze data associated with the eyes of the user based on, for instance, infrared reflections between the cornea and pupils. The headset 102 can further cause the adjustment assembly 100 to adjust the first distance between the first lens 110 and the second lens 112 along the first axis 132 based at least in part on the interpupillary distance of the user and cause the adjustment assembly 100 to adjust the second distance along the second axis 152 that is orthogonal to the first axis based at least in part on the eye relief distance.

In some examples, the headset 102 can further include a measurement component 158 configured to measure the first distance between the first lens 110 and the second lens 112 and the second distance between optical assembly 106 to the eyes of the user. In some examples, the measurement component 158 can include a first rheostat configured to measure the first distance and a second rheostat configured to measure the second distance. The processor(s) of the headset 102 can compare the measurement data with the interpupillary distance and the eye relief distance of the user. In response to determining that the measurement data is inconsistent with the interpupillary distance and/or the eye relief distance of the user, the processor(s) of the headset 102 can control the adjustment assembly to adjust the first distance and/or the second distance based on the interpupillary distance and/or the eye relief distance of the user.

Figure 2A:
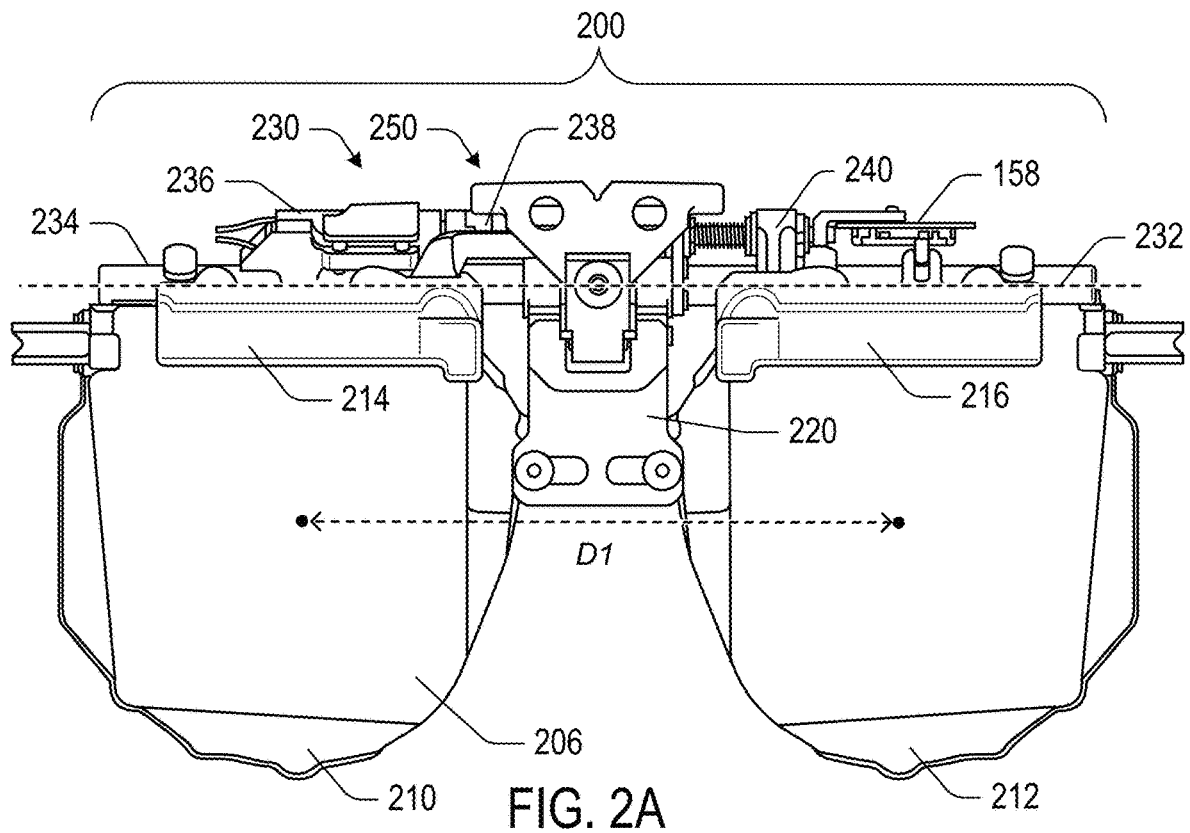
FIGS. 2A and 2B illustrate perspective front views of the example adjustment assembly of FIG. 1, in accordance with one or more examples.
Figure 2B:
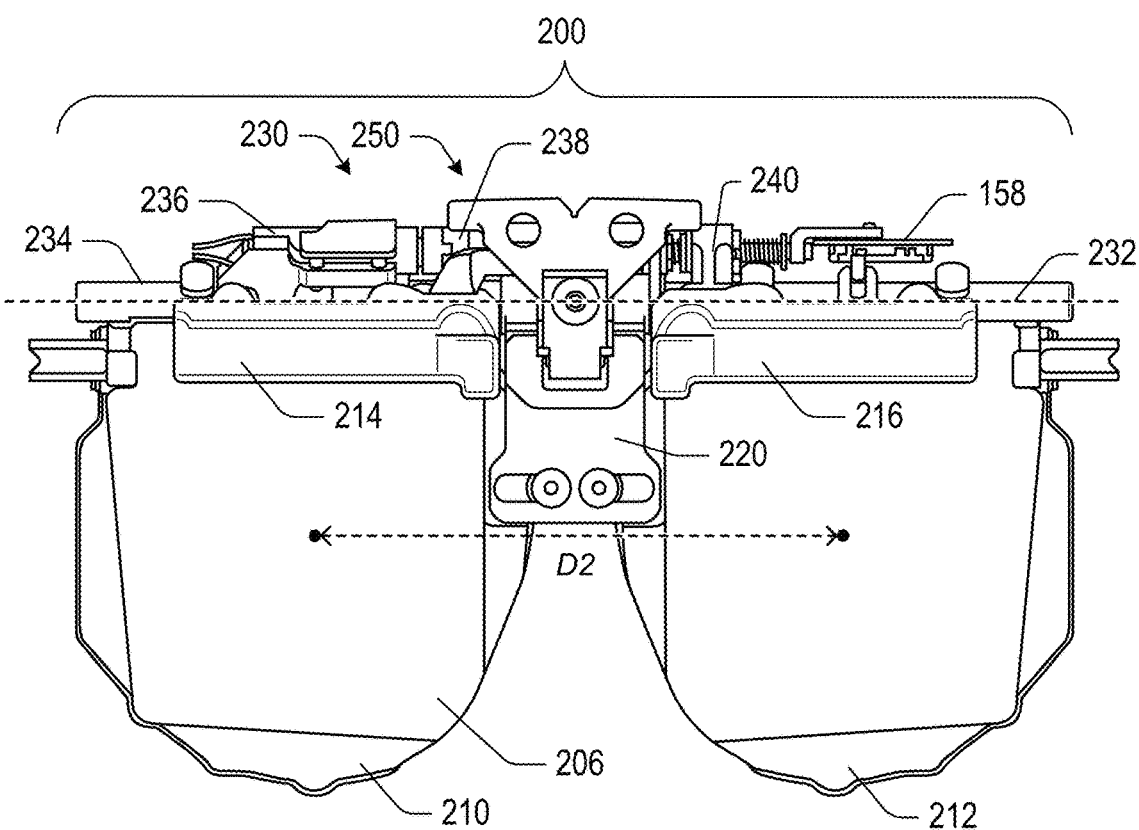

FIGS. 2A and 2B illustrate perspective front views of an example adjustment assembly 200 coupling an optical assembly 206. The adjustment assembly 200 can generally correspond to the adjustment assembly 100, and the optical assembly 206 can generally correspond to the optical assembly 106, as introduced in FIG. 1. For example, the adjustment assembly 200 can include an interpupillary distance adjustment mechanism 230 and an eye relief distance adjustment mechanism 250. The optical assembly 206 can include a first lens 210, a second lens 212, a first lens holder 214, a second lens holder 216, and a constraint member 220. The interpupillary distance adjustment mechanism 230 can include a shaft 234 and a turnbuckle 236.

The turnbuckle 236 is coupled with a first connection member 238 and a second connection member 240 and is rotated to cause the first connection member 238 and the second connection member 240 to slide away from or closer to each other along the shaft 234. The shaft 234 may extend along a longitudinal axis 232. The shaft 234 may include any suitable material. In some examples, the shaft 234 may include a hypodermic tube. By rotating the turnbuckle 236, the first connection member 238 coupled with the first lens holder 214 and second connection member 240 coupled with the second lens holder 216 can be driven to move closer to or away from each other, thereby adjusting a first distance between the first lens 210 and the second lens 212. In the examples shown in FIGS. 2A and 2B, the first distance between the first lens 210 and the second lens 212 is defined as a distance between a focal point of the first lens 210 and a focal point of the second lens 212.

The headset 102 can receive sensing data indicating interpupillary distance of the user. The headset 102 can further receive measurement data indicating the first distance between the first lens 210 and the second lens 212 from the measurement component 158. One or more processor(s) of the headset 102 can determine whether the measurement data is consistent with the sensing data. In response to determining that the measurement data is inconsistent with the sensing data, the processor(s) of the headset 102 can cause the adjustment assembly 200 to adjust the first distance between the first lens 210 and the second lens 212 based on the sensing data.

In one example, the processor(s) of the headset 102 can determine whether the first distance is less than the interpupillary distance of the user based on the measurement data and the sensing data. In response to determining that the first distance between the first lens 210 and the second lens 212 is less than the interpupillary distance of the user, the processor(s) of the headset 102 can cause the turnbuckle 236 to rotate in a first direction (e.g., clockwise) to slide the first connection member 238 and the second connection member 240 away from each other, thereby causing the first lens 210 and the second lens 212 to move farther apart. FIG. 2A shows an example of the interpupillary distance adjustment mechanism 230 causing the first lens 210 and the second lens 212 to be spaced from each other by a maximum first distance D1 along the axis 232. In some examples, the maximum first distance D1 may be about 72 millimeters (mm).

In one example, the processor(s) of the headset 102 can determine whether the first distance is greater than the interpupillary distance of the user based on the measurement data and the sensing data. In response to determining that the first distance between the first lens 210 and the second lens 212 is greater than the interpupillary distance of the user, the processor(s) of the headset 102 can cause the turnbuckle 236 to rotate in a second direction (e.g., counterclockwise) opposite of the first direction to slide the first connection member 238 and the second connection member 240 closer to each other, thereby causing the first lens 210 and the second lens 212 to move closer together. FIG. 2B shows an example of the interpupillary distance adjustment mechanism 230 causing the first lens 210 and the second lens 212 to be spaced from each other by a minimum first distance D2 along the axis 232. In some examples, the minimum first distance D2 may be about 58 millimeters (mm).

FIGS. 3A and 3B illustrate perspective top-down views of an example adjustment assembly 300 coupling an optical assembly 306. The adjustment assembly 300 can generally correspond to the adjustment assembly 100, and the optical assembly 306 can generally correspond to the optical assembly 106, as introduced in FIG. 1. For example, the adjustment assembly 300 can include an interpupillary distance adjustment mechanism 330 and an eye relief distance adjustment mechanism 350. The optical assembly 306 can include a left lens and a right lens (not shown in FIG. 3). The interpupillary distance adjustment mechanism 330 can include a turnbuckle 336, and a shaft 334 extends along a first axis 332. The interpupillary distance adjustment mechanism 330 is configured to move the left lens and right lens closer to or away from each other along the first axis 332.

The eye relief distance adjustment mechanism 350 includes a slide system 354 configured to move the optical assembly 106 along the second axis 352 that is orthogonal to the first axis 332 to adjust the second distance between the optical assembly 306 to the eyes of the user. In one example, the slide system 354 can include gear, a rack coupled to the gear, and an attachment structure attaching to the rack and the optical assembly 306. The gear is configured to cause the rack to move the attachment structure forward or backward along the second axis 352. By rotating the gear, the rack can be driven to move the attachment structure forward or backward along the second axis 352, thereby adjusting a second distance along the second axis 352 that is orthogonal to the first axis 332. In the examples shown in FIGS. 3A and 3B, the second distance along the second axis 352 is defined as a distance between the optical assembly 306 to the eyes of the user.

In some examples, the headset 102 can receive input data indicating the eye relief distance of the user. Alternatively, the headset 102 can determine the eye relieve distance of the user based on sensor data received from a sensor of the headset 102. The headset 102 can further receive measurement data indicating the second distance between the assembly 306 to the eyes of the user from the measurement component 158. The headset 102 can determine whether the measurement data is consistent with the sensing data. In response to determining that the measurement data is inconsistent with the input data, the headset 102 can cause the adjustment assembly 300 to adjust the second distance along the second axis 352 based on the input data.

In one example, the headset 102 can determine whether the second distance is less than the eye relief distance of the user based on the measurement data and the input data. In response to determining that the second distance along the second axis 352 is less than the eye relief distance of the user, the headset 102 can cause the slide system to slide in a first direction (e.g., forward) away from the user, thereby increasing the second distance. FIG. 3A shows an example of the eye relief distance adjustment mechanism 350 causing the optical assembly 306 to slide a maximum second distance away from the eyes of a user along the second axis 352. In some examples, the maximum second distance may be about 20 millimeters (mm).

In one example, the headset 102 can determine whether the second distance is greater than the eye relief distance of the user based on the measurement data and the input data. In response to determining that the second distance along the second axis 352 is greater than the eye relief distance of the user, the headset 102 can cause the slide system to slide in a second direction (e.g., backward) closer to the user, thereby decreasing the second distance. FIG. 3B shows an example of an eye relief distance adjustment mechanism 350 causing the optical assembly 306 to slide a minimum second distance closer to the eyes of a user along a second axis 352. In some examples, the minimum second distance may be about 8 millimeters (mm).

Figure 4A:
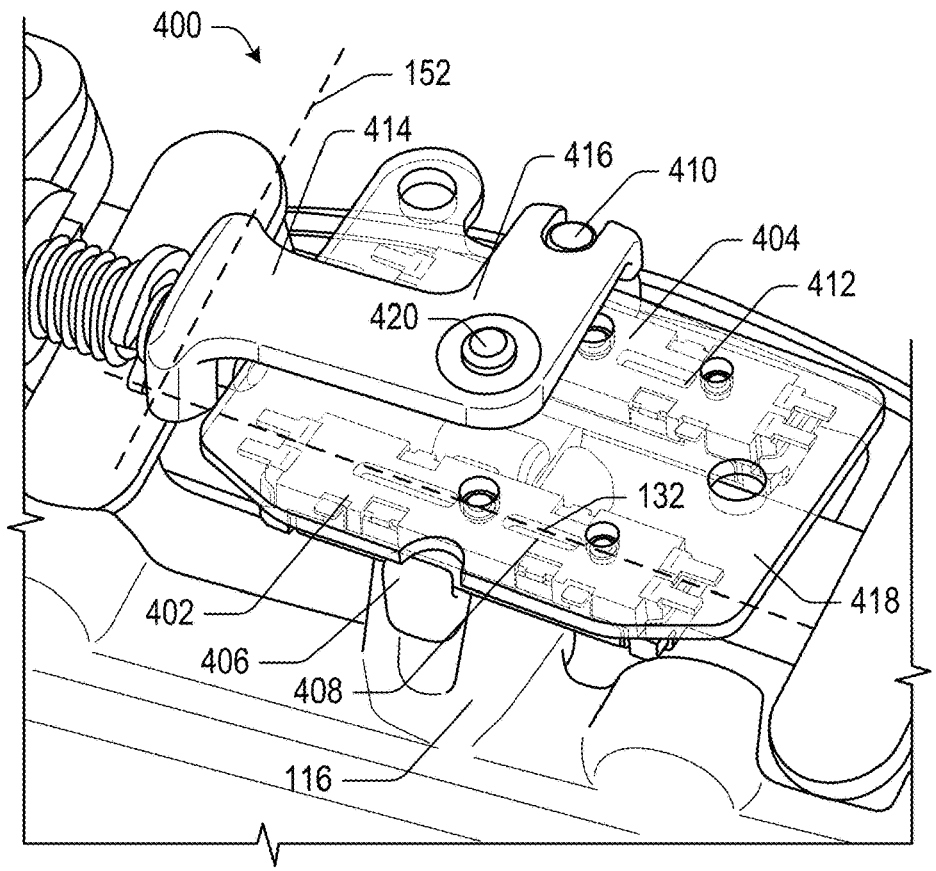
FIG. 4A illustrates a perspective front view of an example measurement component, in accordance with one or more examples.
Figure 4B:
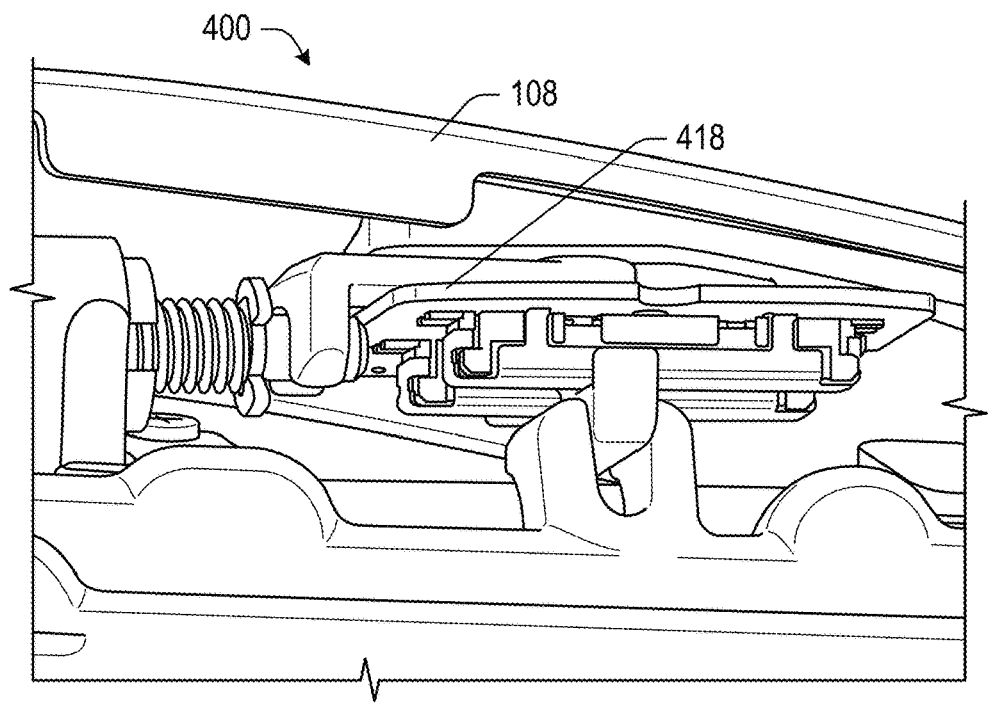
FIG. 4B illustrates a perspective top-down view of the example measurement component of FIG. 4A, in accordance with one or more examples.

FIGS. 4A and 4B illustrate an example measurement component 400, which can generally correspond to measurement component 158 in the headset 102 as introduced in FIG. 1. For example, the headset 102 can include the housing 104, the optical assembly 106, the adjustment assembly 100, and the measurement component 400. The optical assembly 106 can include the first lens 110 and the second lens 112 spaced from the first lens 110 by a first distance. The adjustment assembly 100 can include the interpupillary distance adjustment mechanism 130 and the eye relief distance adjustment mechanism 150. The interpupillary distance adjustment mechanism 130 is configured to adjust the first distance between the first lens 110 and the second lens 112 in a first direction (e.g., in a first direction along the axis 132), and the eye relief distance adjustment mechanism 150 is configured to adjust the optical assembly 106 a second distance in a second direction (e.g., in a second direction along the axis 152) that is orthogonal to the first direction. The measurement component 400 is configured to measure the first distance and the second distance via motion in the first direction.

FIG. 4A shows a perspective top-down view of the measurement component 400. The example measurement component 400 shown in FIG. 4A can include a first rheostat 402 configured to measure the first distance and a second rheostat 404 configured to measure the second distance, where the second rheostat 404 is positioned parallel to the first rheostat 402. The first rheostat 402 can include a first slider 406 and a first resistance track 408. The first slider 406 can be attached to the optical assembly 106 and be configured to slide along the first resistance track 408. As shown in FIG. 4A, the first slider 406 is attached to the second lens holder 116. The interpupillary distance adjustment mechanism 130 may cause the second lens holder 116 to slide along the axis 132, thereby causing the first slider 406 to slide along the first resistance track 408.

The second rheostat 404 can include a second slider 410 and a second resistance track 412. The second slider 410 can be coupled with a connection member 414, and the connection member 414 is attached to the adjustment assembly 100. The second slider 410 is configured to slide along the second resistance track 412 that is parallel to the first resistance track 408.

In some examples, the connection member 414 can include a linkage 416 pivotably coupled to a mounting component 418 and is configured to translate a motion of the eye relief distance adjustment mechanism 150 in the second direction to the first direction. As illustrated in FIG. 4A, a first proximal end of the linkage 416 is coupled to the adjustment assembly 100, and a second proximal end of the linkage 416 is coupled to the second slider 410. The linkage 416 is configured to translate a motion of the eye relief distance adjustment mechanism 150 in the second direction along the axis 152 to the first direction along the axis 132. In some examples, the linkage 416 includes an L-shaped linkage.

The mounting component 418 is configured to attach the measurement component 400 to the housing 104 of the headset 102. FIG. 4B illustrates a perspective top-down view of the example measurement component 400 of FIG. 4A attached to the housing 104 of the headset 102 via the mounting component 418.

Figure 5:
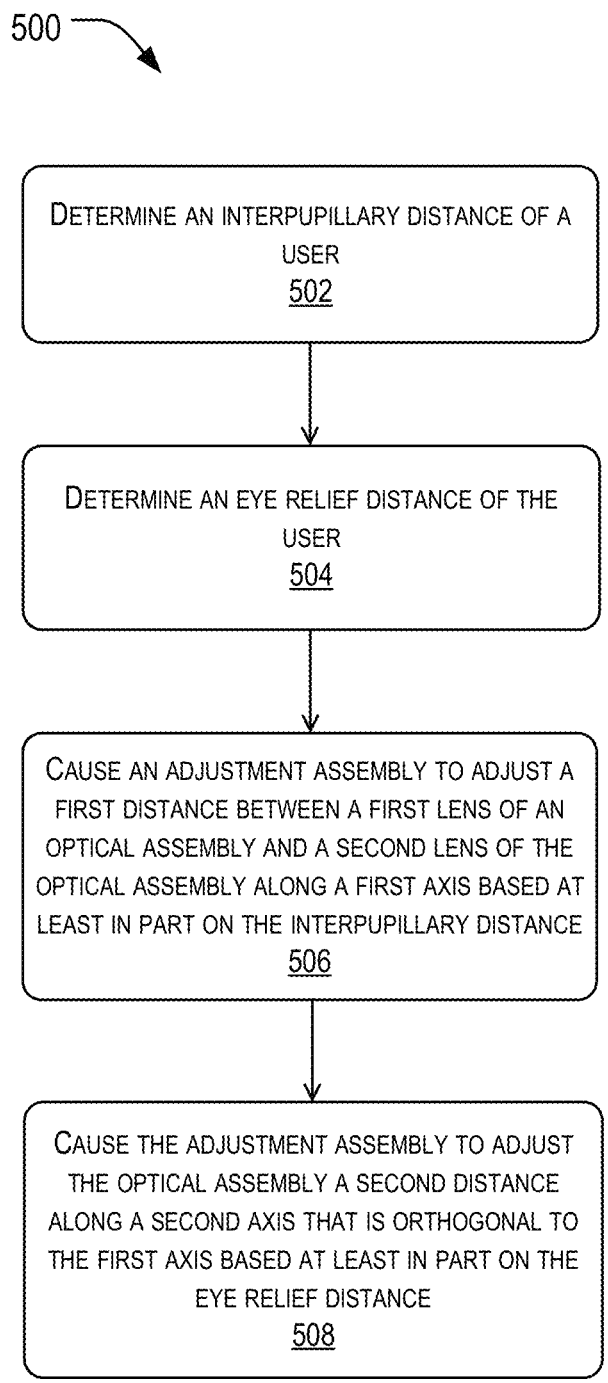
FIG. 5 is a flowchart of an example process for adjusting interpupillary distance and eye relief distance of a headset, in accordance with one or more examples.

FIG. 5 illustrates an example process 500 for adjusting interpupillary distance and eye relief distance of the headset 102 using the adjustment assembly 100. The process 500 may be performed by components of a system, discussed above with respect to FIGS. 1-4. The process 500 may be performed at least in part by one or more processors of the headset 102. Furthermore, the process 500 may include different and/or additional operations, or perform the operations in a different order than described herein.

At 502, the process 500 includes determining interpupillary distance of a user. In some examples, the interpupillary distance can be provided by the user, such as via user input (e.g., voice command(s), gestures, touch inputs, controller inputs, etc.). In some examples, the interpupillary distance may be sensed by a sensing component (e.g., a gaze tracking component, an eye-tracking component, a camera, etc.) included in the headset.

At 504, the process 500 includes determining an eye relief of a user. The eye relief distance can be provided by the user, such as via user input (e.g., voice command(s), gestures, touch inputs, controller inputs, etc.).

At 506, the process 500 includes causing an adjustment assembly to adjust a first distance between a first lens of an optical assembly and a second lens of the optical assembly along a first axis based at least in part on the interpupillary distance of the user. For example, when the first distance between the first lens and the second lens is inconsistent with the interpupillary distance of the user, one or more processor(s) of the headset may cause the adjustment assembly to adjust the first distance so that the first distance between the lenses matches the interpupillary distance of the user.

At 508, the process 500 includes causing the adjustment assembly to adjust the optical assembly a second distance along a second axis that is orthogonal to the first axis based at least in part on the eye relief distance. For example, when the second distance between the optical assembly and the eyes of the user is inconsistent with the eye relief distance of the user, one or more processor(s) of the headset may cause the adjustment assembly to adjust the second distance so that the second distance between the optical assembly and the eyes of the user matches the eye relief distance of the user.

Figure 6:
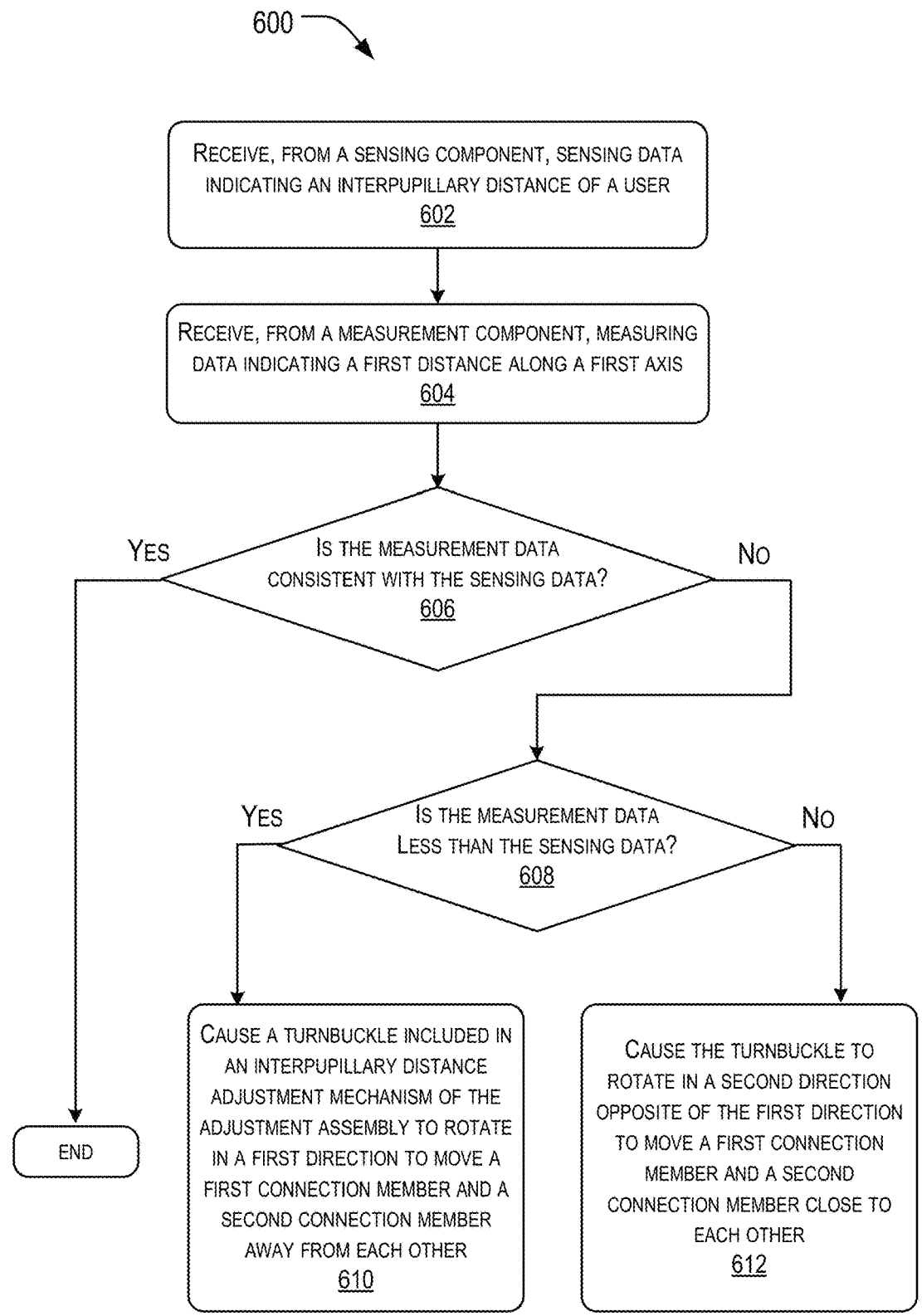
FIG. 6 is a flowchart of an example process for adjusting interpupillary distance of a headset based on a sensed interpupillary distance of a user, in accordance with one or more examples.

FIG. 6 illustrates an example process for adjusting interpupillary distance of the headset 102 using the adjustment assembly 100. The process 600 may be performed by components of a system, discussed above with respect to FIGS. 1-4. The process 600 may be performed at least in part by one or more processors of the headset 102. Furthermore, the process 600 may include different and/or additional operations, or perform the operations in a different order than described herein.

At 602, the process 600 includes receiving, from a sensing component, sensing data indicating interpupillary distance of a user.

At 604, the process 600 includes receiving, from a measurement component, measurement data indicating a first distance along a first axis. The first distance indicates a distance between a first lens of an optical assembly and a second lens of the optical assembly along the first axis.

At 606, the process 600 includes determining whether the measurement data is consistent with the sensing data. If, at 606, the processor(s) determine that the measurement data is consistent with the sensing data ("YES" at 606), the processor(s) may maintain the first distance between the first lens of the optical assembly and the second lens of the optical assembly.

If, however, the processor(s) determine that the measurement data is inconsistent with the sensing data ("NO" at 606), the processor(s) may determine whether the measurement data is less than the interpupillary distance of the user, at 608.

At 608, the process 600 includes determining, based on the measurement data and the sensing data, whether the first distance is less than the interpupillary distance of the user. If the processor(s) determine that the first distance is less than the interpupillary distance of the user ("YES" at 608), the processor(s) may cause a turnbuckle included in an interpupillary distance adjustment mechanism of the adjustment assembly to rotate in a first direction to move a first connection member and a second connection member away from each other, at 610. The first connection member is attached to a first lens holder of the optical assembly, and the second connection member is attached to a second lens holder of the optical assembly. By rotating the turnbuckle in the first direction (e.g., clockwise), the first connection member and the second connection member can be driven to slide away from each other, thereby causing the first lens holder and the second lens holder to move farther apart.

If, however, the processor(s) determine that the first distance is greater than the interpupillary distance of the user ("NO" at 608), the processor(s) may cause the turnbuckle to rotate in a second direction opposite of the first direction to move the first connection member and the second connection member closer to each other, at 612. By rotating the turnbuckle in the second direction (e.g., counterclockwise), the first connection member and the second connection member can be driven to slide closer to each other, thereby causing the first lens holder and the second lens holder to move closer together.

Figure 7:
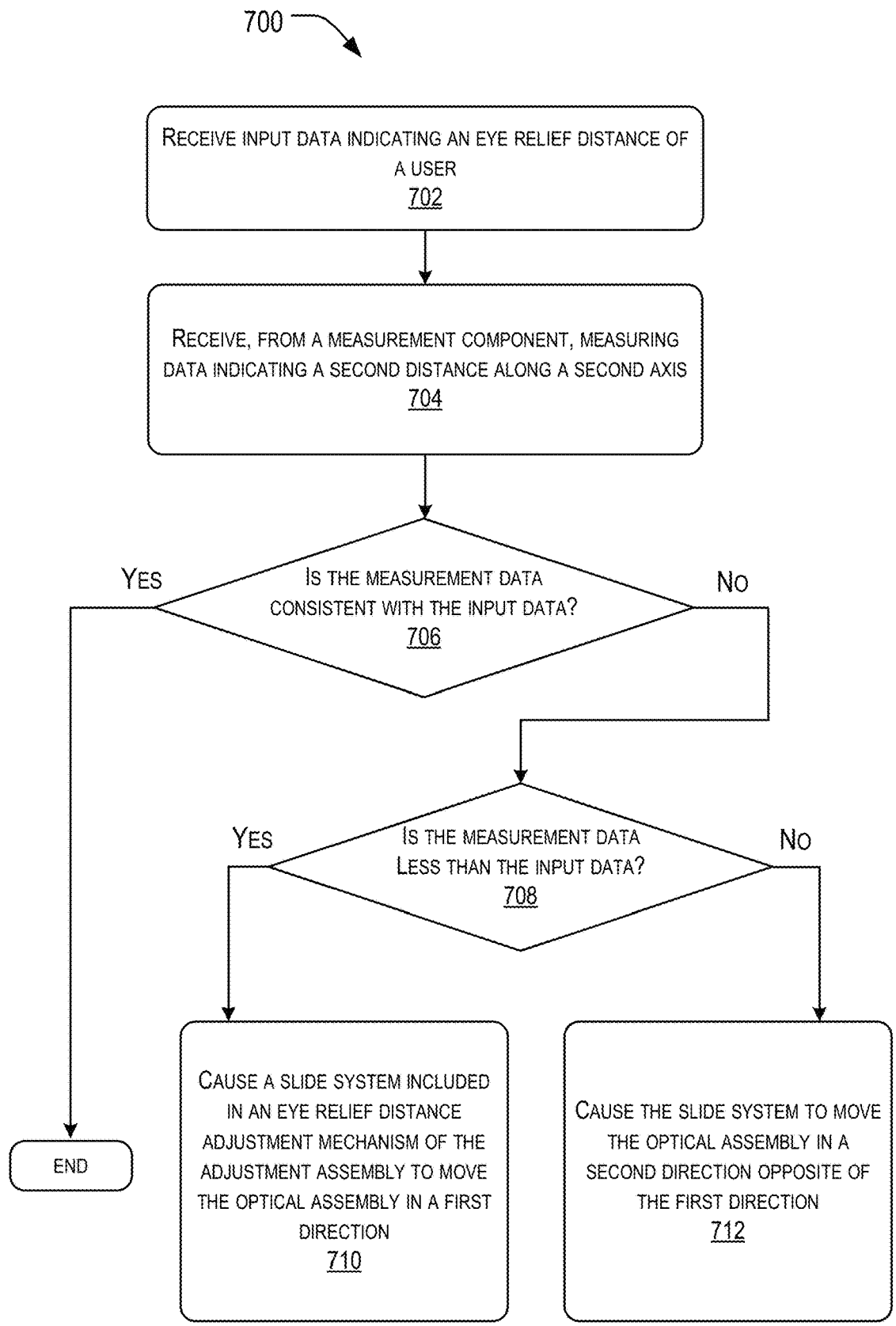
FIG. 7 is a flowchart of an example process for adjusting eye relief distance of a headset based on eye relief distance of a user, in accordance with one or more examples.

FIG. 7 illustrates an example process 700 for adjusting eye relief distance of the headset 102 using the adjustment assembly of FIG. 1. The process 700 may be performed by components of a system, discussed above with respect to FIGS. 1-4. The process 700 may be performed at least in part by one or more processors of the headset 102. Furthermore, the process 700 may include different and/or additional operations, or perform the operations in a different order than described herein.

At 702, the process 700 includes receiving input data indicating eye relief distance of the user.

At 704, the process 700 includes receiving, from a measurement component, measurement data indicating a second distance along a second axis. The second distance indicates a distance from an optical assembly included in the headset 102 to eyes of the user.

At 706, the process 700 includes determining whether the measurement data is consistent with the input data. If, at 706, the processor(s) determine that the measurement data is consistent with the input data ("YES" at 706), the processor(s) may maintain the second distance.

If, however, the processor(s) determine that the measurement data is inconsistent with the input data ("NO" at 706), the processor(s) may determine whether the measurement data is less than the eye relief distance of the user, at 708.

At 708, the process 700 includes determining, based on the measurement data and the input data, whether the second distance is less than the eye relief distance of the user. If the processor(s) determine that the second distance is less than the interpupillary distance of the user ("YES" at 708), the processor(s) may cause a slide system included in an eye relief distance adjustment mechanism of the adjustment assembly to move the optical assembly in a first direction (e.g., in a direction away from the eyes of the user), at 710.

If, however, the processor(s) determine that the second distance is greater than the eye relief distance of the user ("NO" at 708), the processor(s) may cause the slide system to move the optical assembly in a second direction (e.g., in a direction closer to the eyes of the user) opposite of the first direction, at 712.

Figure 8:
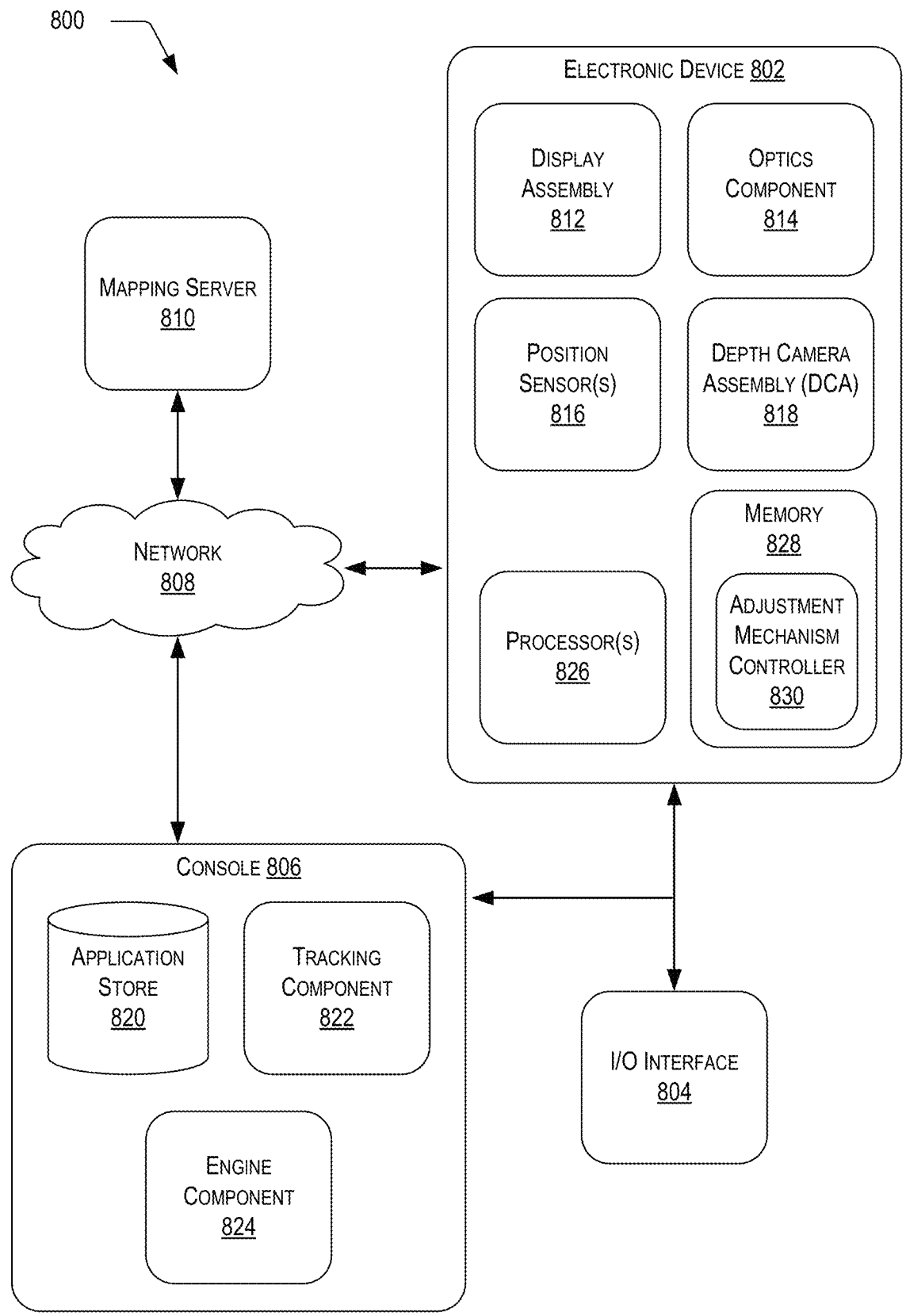
FIG. 8 is an example system for adjusting interpupillary distance and eye relief distance of a headset, in accordance with one or more examples.

FIG. 8 is a block diagram of an example environment 800 including a system for adjusting interpupillary distance and eye relief distance of a headset, in accordance with one or more examples. The example environment 800 can include an artificial reality environment (e.g., a virtual reality environment, an augmented reality environment, a mixed reality environment, or some combination thereof). The example environment 800 includes an electronic device 802, an input/output (I/O) interface 804 that is coupled to a console 806, a network 808, and a mapping server 810, although the environment may include additional and/or alternate components. In some examples, the electronic device 802 corresponds to the headset 102 of FIG. 1.

While FIG. 8 shows an example environment 800 including one electronic device 802 and one I/O interface 804, examples are considered in which any number of these components can be included in the example environment 800. For example, there may be multiple electronic devices each having an associated I/O interface 804, with each electronic device and I/O interface 804 communicating with the console 806. In some cases, different and/or additional components may be included in a system in the example environment 800. Functionality described in relation to one or more of the components shown in FIG. 8 may be distributed among the components in a different manner than described herein. For example, some or all of the functionality of the console 806 may be provided by the electronic device 802.

In some examples, the electronic device 802 can include a display assembly 812, an optics component 814, one or more position sensors 816, a depth camera assembly (DCA) 818, one or more processor(s) 826, and memory 828. Some examples of the electronic device 802 have different components than those described in relation to FIG. 8. Additionally, the functionality provided by various components described in relation to FIG. 8 may be differently distributed among the components of the electronic device 802, in some examples, or be captured in separate assemblies remote from the electronic device 802.

In some examples, the display assembly 812 displays content in accordance with data received from the console 806. The display assembly 812 can display the content using one or more display elements. A display element can be, for instance, an electronic display. In some examples, the display assembly 812 can comprise a single display element or multiple display elements (e.g., a display for each eye of a user). Examples of an electronic display include, but are not limited to, a liquid crystal display (LCD), an organic light emitting diode (OLED) display, an active-matrix organic light-emitting diode display (AMOLED), a waveguide display, or some combination of these display types. In some examples, the display assembly 812 can also be configured to perform some or all of the functionality of the optics component 814.

In some examples, the optics component 814 can magnify image light received from the display assembly 812, correct optical errors associated with the image light, and present the corrected image light to one or both eye boxes of the electronic device 802. In some examples, the optics component 814 includes one or more optical elements such as an aperture, a Fresnel lens, a convex lens, a concave lens, a filter, a reflecting surface, or any other suitable optical element that can affect image light. In some cases, the optics component 814 may include combinations of different optical elements. In some examples, one or more of the optical elements in the optics component 814 can be coated by one or more coatings, such as partially reflective or anti-reflective coatings.

Magnification and focusing of the image light by the optics component 814 allows an electronic display of the display assembly 812 to be physically smaller, weigh less, and consume less power than larger displays. Additionally, magnification by the optics component 814 can increase the field of view of the content presented by the electronic display. For example, the electronic display can display content in the field of view such that the displayed content is presented using almost all (e.g., approximately 110 degrees diagonal), and in some cases, all of a user's field of view. Additionally, in some examples, an amount of magnification can be adjusted by adding or removing optical elements of the optics component 814.

In some examples, the optics component 814 can be designed to correct one or more types of optical error. Examples of optical error include, but are not limited to, barrel or pincushion distortion, longitudinal chromatic aberrations, transverse chromatic aberrations, spherical aberrations, chromatic aberrations, or errors due to the lens field curvature, astigmatisms, and so forth. In some examples, content provided to the electronic display for display to a user can be pre-distorted, and the optics component 814 can correct the distortion after receiving image light associated with the content.

In some examples, the position sensor 816 can be configured to generate data that indicates a position of the electronic device 802. In some examples, the position sensor 816 generates one or more measurement signals in response to motion of the electronic device 802. The position sensor(s) 816 can include one or more of an IMU (Inertial Measurement Unit), accelerometer, gyroscope, magnetometer, another suitable type of sensor that detects motion, or some combination thereof. In some cases, the position sensor 816 can include multiple accelerometers to measure translational motion (forward/back, up/down, left/right) and multiple gyroscopes to measure rotational motion (e.g., pitch, yaw, roll). In some examples, the position sensors 816 include an IMU that rapidly samples measurement signals and calculates an estimated position of the electronic device 802 from the sampled data. For example, the IMU can integrate the measurement signals received from the accelerometers over time to estimate a velocity vector and integrate the velocity vector over time to determine an estimated position of a reference point on the electronic device 802 that describes a position of the electronic device 802 in the environment. The reference point can be defined as a point in space and/or defined as a point within the electronic device 802.

In some examples, the DCA 818 generates depth information for an environment surrounding the electronic device 802. The DCA 818 can include one or more imaging devices, an illuminator, and a DCA controller (not shown). Operation and structure of the DCA 818 is described above with regard to FIG. 1.

The processor(s) 826 may be any suitable processor capable of executing instructions to process data and perform operations as described herein. By way of example and not limitation, the processor(s) 826 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

The memory 828 may be examples of non-transitory computer-readable media. The memory 828 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein. In some instances, the memory 828 may store an adjustment mechanism controller 830 which may be configured to one or more motors (e.g., motor 160 and/or motor 162) included in the electronic device 802.

In some examples, the I/O interface 804 can be a device that allows a user to send action requests and receive responses from the console 806. In some examples, an action request can be an instruction to start or end capture of image or video data, or an instruction to perform a particular action within an application. The I/O interface 804 can include one or more input devices, such as a keyboard, a mouse, a game controller, or any other suitable device for receiving action requests and communicating the action requests to the console 806. In some examples, an action request received by the I/O interface 804 is communicated to the console 806, which performs an action corresponding to the action request. In some examples, the I/O interface 804 includes an IMU that captures calibration data that indicates an estimated position of the I/O interface 804 relative to an initial position of the I/O interface 804. In some examples, the I/O interface 804 can provide haptic feedback to the user in accordance with instructions received from the console 806. For example, haptic feedback is provided when an action request is received, or the console 806 communicates instructions to the I/O interface 804 causing the I/O interface 804 to generate haptic feedback when the console 806 performs an action.

In some examples, the console 806 provides content to the electronic device 802 for processing in accordance with information received from one or more of the DCA 818, the electronic device 802, and/or the I/O interface 804. In the example shown in FIG. 5, the console 806 includes an application store 820, a tracking component 822, and an engine component 824. Some examples of the console 806 have additional and/or different components than those described in relation to FIG. 5. Additionally, the functions described below can be distributed among components of the console 806 in a different manner than described in relation to FIG. 5. In some examples, the functionality discussed herein with respect to the console 806 can be implemented in the electronic device 802, and/or a remote system.

In some examples, the application store 820 can store one or more applications for execution by the console 806. An application is a group of instructions, that when executed by a processor, generates content for presentation to the user. Content generated by an application can be in response to inputs received from the user via movement of the electronic device 802 and/or the I/O interface 804. Examples of applications include, but are not limited to, gaming applications, conferencing applications, video playback applications, or other suitable applications.

In some examples, the tracking component 822 tracks movements of the electronic device 802 and/or of the I/O interface 804 using information from the DCA 818, the one or more position sensors 816, or some combination thereof. For example, the tracking component 822 determines a position of a reference point of the electronic device 802 in a mapping of a local area of an environment based on information from the electronic device 802. The tracking component 822 can also determine positions of an object or virtual object. Additionally, in some examples, the tracking component 822 can use data that indicates a position of the electronic device 802 from the position sensor 816 as well as representations of the local area from the DCA 818 to predict a future location of the electronic device 802. The tracking component 822 can provide the estimated or predicted future position of the electronic device 802 and/or the I/O interface 804 to the engine component 824.

In some examples, the engine component 824 can execute applications and receive position information, acceleration information, velocity information, predicted future positions, or some combination thereof, of the electronic device 802 from the tracking component 822. Based on the received information, the engine component 824 can determine content to provide to the electronic device 802 for presentation to the user. For example, if the received information indicates that the user has looked to the left, the engine component 824 can generate content for the electronic device 802 that mirrors the user's movement in a virtual local area or in a local area augmenting the local area with additional content. Additionally, the engine component 824 can perform an action within an application executing on the console 806 in response to an action request received from the I/O interface 804 and provide feedback to the user that the action was performed. The provided feedback can be visual or audible feedback via the electronic device 802, or haptic feedback via the I/O interface 804.

In some examples, the network 808 couples the electronic device, the console 806, and the mapping server 810. The network 808 can include any combination of local area and/or wide area networks using both wireless and/or wired communication systems. For example, the network 808 can include the Internet and/or mobile telephone networks. In some cases, the network 808 uses standard communications technologies and/or protocols. Hence, the network 808 can include links using technologies such as Ethernet, 802.11, worldwide interoperability for microwave access (WiMAX), 2G/3G/4G/5G mobile communications protocols, digital subscriber line (DSL), asynchronous transfer mode (ATM), InfiniBand, PCI (Peripheral Component Interconnect) Express Advanced Switching, and so forth. The networking protocols used on the network 808 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and so on. The data exchanged over the network 808 can be represented using technologies and/or formats including image data in binary form (e.g., Portable Network Graphics (PNG)), hypertext markup language (HTML), extensible markup language (XML), and the like. In some examples, all or some information can be encrypted using encryption technologies such as secure sockets layer (SSL), transport layer security (TLS), virtual private networks (VPNs), Internet Protocol security (IPsec), and so on.

In some examples, the mapping server 810 can include a database that stores a virtual model describing a plurality of spaces, where a location in the virtual model corresponds to a current configuration of a local area of the electronic device 802. The mapping server 810 can receive, from the electronic device 802 via the network 808, information describing at least a portion of the environment surrounding the electronic device 802 and/or location information for the environment surrounding the electronic device 802. A user can adjust privacy settings to allow or prevent the electronic device 802 from transmitting information to the mapping server 810. In some examples, the mapping server 810 determines, based on the received information and/or location information, a location in the virtual model that is associated with the local area of the environment where the electronic device 802 is located. The mapping server 810 can determine (e.g., retrieve) one or more acoustic parameters associated with the local area, based in part on the determined location in the virtual model and any acoustic parameters associated with the determined location. The mapping server 810 can transmit the location of the local area and values of acoustic parameters associated with the local area to the electronic device 802.

One or more components of the example environment 800 can contain a privacy component that stores one or more privacy settings for user data elements. The user data elements describe the user and/or the electronic device 802. For example, the user data elements can describe a physical characteristic of the user, an action performed by the user, a location of the user associated with the electronic device 802, a location of the electronic device 802, an HRTF (Head Related Transfer Function) for the user, and so forth. Privacy settings (or "access settings") for a user data element can be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some examples, the privacy settings for a user data element can specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user associated with an electronic device within the same local area as the user. If the user subsequently changes location, the entity with access to the user data element may lose access, while a new group of entities may gain access as they come within the threshold distance of the user.

The example environment 800 may include one or more authorization/privacy servers for enforcing privacy settings. A request from an entity for a particular user data element can identify the entity associated with the request and the user data element can be sent only to the entity if the authorization server determines that the entity is authorized to access the user data element based on the privacy settings associated with the user data element. If the requesting entity is not authorized to access the user data element, the authorization server can prevent the requested user data element from being retrieved or can prevent the requested user data element from being sent to the entity. Although this disclosure describes enforcing privacy settings in a particular manner, this disclosure contemplates enforcing privacy settings in any suitable manner.

The foregoing description has been presented for illustration; it is not intended to be exhaustive or to limit the scope of the disclosure to the precise forms disclosed. Modifications and variations are contemplated considering the above disclosure.

Some portions of this description describe the examples in terms of algorithms and symbolic representations of operations on information. These algorithmic descriptions and representations may be used by those skilled in the data processing arts to convey the substance of their work effectively to others skilled in the art. These operations, while described functionally, computationally, or logically, are understood to be implemented by computer programs or equivalent electrical circuits, microcode, or the like. The described operations and their associated components may be embodied in software, firmware, hardware, or any combinations thereof.

Any of the operations or processes described herein may be performed or implemented with one or more hardware or software modules, alone or in combination with other devices. In some examples, a software module is implemented with a computer program product comprising a computer-readable medium containing computer program code, which can be executed by a computer processor for performing any or all the operations or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to a product that is produced by a computing process described herein. Such a product may comprise information resulting from a computing process, where the information is stored on a non-transitory, tangible computer readable storage medium and may include any example of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the examples is intended to be illustrative, but not limiting, of the scope of the patent rights, which is set forth in the following claims.

CONCLUSION

Although the discussion above sets forth example implementations of the described techniques, other architectures can be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A headset comprising:
   an optical assembly associated with the headset, wherein the optical assembly comprises a first lens and a second lens spaced from the first lens by a first distance;
   an adjustment assembly comprising:
      an interpupillary distance adjustment mechanism configured to adjust the first distance between the first lens and the second lens in a first direction; and
      an eye relief distance adjustment mechanism configured to adjust the optical assembly a second distance in a second direction that is orthogonal to the first direction; and
   a measurement component configured to measure the first distance and the second distance via motion in the first direction, wherein the measurement component comprises a first rheostat configured to measure the first distance.

2. The headset of claim 1, wherein the measurement component further comprises:
a second rheostat configured to measure the second distance, wherein the second rheostat is positioned parallel to the first rheostat.

3. The headset of claim 2, wherein the first rheostat comprises a first slider and a first resistance track, wherein the first slider is attached to the optical assembly, wherein the first slider is configured to slide along a first resistance track;
wherein the second rheostat comprises a second slider and a second resistance track, wherein the second slider is coupled with a connection member, wherein the connection member is attached to the adjustment assembly, wherein the second slider is configured to slide along a second resistance track that is parallel to the first resistance track.

4. The headset of claim 3, wherein the connection member comprises a linkage configured to translate a motion of the eye relief distance adjustment mechanism in the second direction to the first direction.

5. The headset of claim 1, further comprising:
a housing; and
a mounting component attached to the housing, wherein the mounting component is coupled to the adjustment assembly.

6. The headset of claim 1, further comprising:
a housing; and
a mounting component attached to the housing, wherein the mounting component is coupled to the measurement component.

7. The headset of claim 6, wherein the measurement component comprises a linkage pivotably coupled to the mounting component and is configured to translate a motion of the adjustment assembly in the second direction to the first direction.

8. The headset of claim 1, the interpupillary distance adjustment mechanism comprises:
a shaft;
a turnbuckle coupled with a first connection member and a second connection member,
wherein the first connection member is attached to a first lens holder of the optical assembly,
wherein the second connection member is attached to a second lens holder of the optical assembly, and
wherein the turnbuckle is configured to cause the first connection member and the second connection member to slide away from or closer to each other along the shaft.

9. The headset of claim 1, wherein the eye relief distance adjustment mechanism comprises a slide system configured to move the optical assembly along the second direction to adjust the second distance.

10. The headset of claim 1, wherein the optical assembly comprises:
a first lens holder configured to hold the first lens; and
a second lens holder configured to hold the second lens, wherein each of the first lens holder and second lens holder comprises a cover plate configured to hold the respective lens.

11. A measurement component for measuring an interpupillary distance provided by an adjustment assembly in a first direction and an eye relief distance provided by the adjustment assembly in a second direction, wherein the first direction is orthogonal to the second direction, wherein the measurement component comprises:
a first rheostat configured to measure the interpupillary distance;
a second rheostat configured to measure the eye relief distance, wherein the second rheostat is placed parallel to the first rheostat; and
a linkage configured to translate a motion of the adjustment assembly in the second direction to the first direction.

12. The measurement component of claim 11, further comprising a mounting component, wherein the mounting component is attached to a housing of a headset.

13. The measurement component of claim 12, wherein the linkage is pivotally attached to the mounting component at a pivot point and configured to translate the motion of the adjustment assembly in the second direction to the first direction by pivoting about the pivot point.

14. The measurement component of claim 13, wherein the linkage comprises a bell crank.

15. The measurement component of claim 11, wherein the first rheostat comprises a first slider and a first resistance track, wherein the first slider is attached to an optical assembly, wherein the adjustment assembly is configured to adjust the interpupillary distance between a first lens of the optical assembly and a second lens of the optical assembly, wherein the first slider is configured to slide along a first resistance track to measure the interpupillary distance.

16. The measurement component of claim 15, wherein the adjustment assembly comprises an interpupillary distance adjustment mechanism and an eye relief distance adjustment mechanism, wherein the interpupillary distance adjustment mechanism comprises:
a shaft;
a turnbuckle coupled with a first connection member and a second connection member,
wherein the first connection member is attached to a first lens holder of the optical assembly, wherein the second connection member is attached to a second lens holder of the optical assembly, and
wherein the turnbuckle is configured to cause the first connection member and the second connection member to slide away from or closer to each other along the shaft.

17. The measurement component of claim 15, wherein the second rheostat comprises a second slider and a second resistance track, wherein the second slider is coupled with a connection member, wherein the connection member is attached to the adjustment assembly, wherein the adjustment assembly is configured to adjust an eye relief distance of an optical assembly in the second direction, wherein the second slider is configured to slide along a second resistance track to measure the eye relief distance.

18. The measurement component of claim 17, wherein the adjustment assembly comprises an interpupillary distance adjustment mechanism and an eye relief distance adjustment mechanism, wherein the eye relief distance adjustment mechanism comprises a slide system configured to move the optical assembly along the second direction to adjust the eye relief distance.

19. The measurement component of claim 11, wherein the adjustment assembly is coupled to an optical assembly, wherein the adjustment assembly comprises:
an interpupillary distance adjustment mechanism configured to adjust the interpupillary distance between a first lens of the optical assembly and a second lens of optical assembly in the first direction; and an eye relief distance adjustment mechanism configured to adjust the optical assembly the eye relief distance in the second direction that is orthogonal to the first direction.

20. The measurement component of claim 19, wherein the optical assembly comprises:
 a first lens holder configured to hold the first lens; and
 a second lens holder configured to hold the second lens,
 wherein each of the first lens holder and the second lens holder comprises a cover plate configured to hold the respective lens.

\* \* \* \* \*